United States Patent [19]
Castner

[11] Patent Number: 6,013,736
[45] Date of Patent: Jan. 11, 2000

[54] METAL DEACTIVATOR FOR COBALT CATALYZED POLYMERS

[75] Inventor: Kenneth Floyd Castner, Uniontown, Ohio

[73] Assignee: The Goodyear Tire & Rubber Company, Akron, Ohio

[21] Appl. No.: 09/024,037

[22] Filed: Feb. 16, 1998

[51] Int. Cl.$^7$ .......................... C08F 36/06; C08F 136/06
[52] U.S. Cl. ................................... 525/331.9; 525/333.2; 526/335
[58] Field of Search .............................. 525/331.9, 333.2; 526/335

[56] References Cited

U.S. PATENT DOCUMENTS

| | | | |
|---|---|---|---|
| 4,225,690 | 9/1980 | Halasa et al. | 526/183 |
| 5,089,574 | 2/1992 | Castner | 526/142 |
| 5,448,002 | 9/1995 | Castner | 526/140 |
| 5,605,996 | 2/1997 | Chuu et al. | 525/267 |
| 5,834,079 | 11/1998 | Blinka et al. | 428/516 |
| 5,854,351 | 12/1998 | Maier et al. | 525/197 |

FOREIGN PATENT DOCUMENTS

| | | | |
|---|---|---|---|
| 0537639 | 4/1993 | European Pat. Off. | C08L 9/00 |
| 0677546 | 10/1995 | European Pat. Off. | C08J 5/10 |
| 42187 | 1/1967 | Japan . | |

OTHER PUBLICATIONS

Database WPI, Section Ch, Week 9644, Derwent Publications Ltd, London, GB, Class A32, AN 96–440990, XP002104023 & Kr 9 500 084 B (Lee J), Jan. 9, 1995, abstract.

Database WPI, Section Ch, Week 9809, Derwent Publications Ltd, London, GB, Class A32, AN 98–095931, XP002104024 & JP 09 324287 A (CRK KK), Dec. 16, 1997, abstract.

*Primary Examiner*—Rabon Sergent
*Assistant Examiner*—Olga Asinovsky
*Attorney, Agent, or Firm*—Alvin T Rockhill

[57] ABSTRACT

Various benefits can be attained by utilizing trans-1,4-polybutadiene in tire rubber compounds. For instance, the green strength of tire rubber compounds can be improved by including trans-1,4-polybutadiene therein. The inclusion of trans-1,4-polybutadiene in tire rubber compounds is also beneficial because it is strain crystallizable. However, due to its high melting point, it is normally necessary to heat trans-1,4-polybutadiene in order for it to be processed using conventional mixing equipment. This heating step is typically carried out by storing the trans-1,4-polybutadiene in a "hothouse" for a few days prior to its usage. During this storage period, the polymer typically undergoes undesirable oxidative crosslinking which is caused by residual cobalt catalyst and leads to gelation. In fact, the gelation can render the trans-1,4-polybutadiene unprocessable. This invention is based upon the unexpected finding that certain substituted benzoic acids, such as salicylic acid, thiosalicylic acid and acetylsalicylic acid, will act as metal deactivators in polymers. By utilizing the technique of this invention, residual cobalt and/or other metals, such as nickel, that act as prooxidants in polymers, such as trans-1,4-polybutadiene, can be deactivated. This invention more specifically discloses a stabilized trans-1,4-polybutadiene composition which is comprised of trans-1,4-polybutadiene and a substituted benzoic acid selected from the group consisting of salicylic acid, thiosalicylic acid and acetylsalicylic acid.

20 Claims, No Drawings

METAL DEACTIVATOR FOR COBALT CATALYZED POLYMERS

BACKGROUND OF THE INVENTION

By virtue of its high level of crystallinity, trans-1,4-polybutadiene (TPBD) is a thermoplastic resin. Because it contains many double bonds in its polymeric backbone, TPBD can be blended and cocured with rubber. TPBD is similar to syndiotactic-1,2-polybutadiene in this respect. Even though the trans-1,4-polybutadiene is a thermoplastic resin, it becomes elastomeric when cured alone or when cocured with one or more rubbers.

Good molecular weight control can normally be achieved by utilizing an anionic polymerization system to produce TPBD. There is typically an inverse relationship between the catalyst level utilized and the molecular weight attained when anionic polymerization systems are used. Such an anionic polymerization system is disclosed in U.S. Pat. No. 4,225,690. The catalyst system disclosed therein is based on a dialkylmagnesium compound which is activated with a potassium alkoxide. However, such catalyst systems have not proven to be commercially successful.

TPBD is normally prepared utilizing transition metal catalysts or rare earth catalysts. The synthesis of TPBD with transition metal catalysts is described by J. Boor Jr., "Ziegler-Natta Catalysts and Polymerizations," Academic Press, New York, 1979, Chapters 5–6. The synthesis of TPBD with rare earth catalysts is described by D. K. Jenkins, Polymer, 26, 147 (1985). However, molecular weight control is difficult to achieve with such transition metal or rare earth catalysts and monomer conversions are often very modest.

Japanese Patent Application No. 67187-1967 discloses a catalyst system and technique for synthesizing TPBD consisting of 75 to 80 percent trans-1,4-structure and 20 to 25 percent 1,2-structure. The catalyst system described by this reference consists of a cobalt compound having a cobalt organic acid salt or organic ligand, an organoaluminum compound and phenol or naphthol. Gel formation is a serious problem which is frequently encountered when this three-component catalyst system is utilized in the synthesis of TPBD. Gelation is a particularly serious problem in continuous polymerizations. By utilizing the catalyst system and techniques of this invention, TPBD can be synthesized in a continuous process with only minimal amounts of gel formation.

U.S. Pat. No. 5,089,574 is based upon the finding that carbon disulfide will act as a gel inhibitor in conjunction with three component catalyst systems which contain an organocobalt compound, an organoaluminum compound and a para-alkyl-substituted phenol. U.S. Pat. No. 5,089,574 also indicates that conversions can be substantially improved by utilizing para-alkyl substituted phenols which contain from about 12 to about 26 carbon atoms and which preferably contain from about 6 to about 20 carbon atoms.

U.S. Pat. No. 5,089,574 more specifically reveals a process for synthesizing trans-1,4-polybutadiene in a continuous process which comprises continuously charging 1,3-butadiene monomer, an organocobalt compound, an organoaluminum compound, a para-substituted phenol, carbon disulfide and an organic solvent into a reaction zone; allowing the 1,3-butadiene monomer to polymerize in said reaction zone to form the trans-1,4-polybutadiene; and continuously withdrawing the trans-1,4-polybutadiene from said reaction zone.

U.S. Pat. No. 5,448,002 discloses that dialkyl sulfoxides, diaryl sulfoxides and dialkaryl sulfoxides act as molecular weight regulators when utilized in conjunction with cobalt-based catalyst systems in the polymerization of 1,3-butadiene monomer into TPBD. U.S. Pat. No. 5,448,002 reports that the molecular weight of the TPBD produced decreases with increasing levels of the dialkyl sulfoxide, diaryl sulfoxide or dialkaryl sulfoxide present as a molecular weight regulator.

U.S. Pat. No. 5,448,002 specifically discloses a process for the synthesis of trans-1,4-polybutadiene which comprises polymerizing 1,3-butadiene monomer under solution polymerization conditions in the presence of at least one sulfoxide compound selected from the group consisting of dialkyl sulfoxides, diaryl sulfoxides and dialkaryl sulfoxides as a molecular weight regulator and in the presence of a catalyst system which includes an organocobalt compound, an organoaluminum compound and a para-alkyl substituted phenol.

The presence of residual cobalt in TPBD made with cobalt-based catalyst systems is not desirable. This is because the residual cobalt acts as a prooxidant leading to polymer instability during storage. This is a particular problem in cases where the TPBD is stored in a "hothouse" prior to usage, which is a standard procedure in many industries, such as the tire industry. In any case, high levels of residual cobalt in the TPBD lead to problems with polymer stability. It should also be noted that residual nickel in rubbery polymers synthesized with nickel containing catalyst systems also acts as a prooxidant and can lead to undesirable oxidative crosslinking.

Unfortunately, carbon disulfide is typically required as a gel-reducing agent in the synthesis of TPBD with cobalt-based catalyst systems. This is particularly true in the case of continuous polymerization systems. However, the presence of carbon disulfide in such systems reduces the level of catalyst activity and generally makes it necessary to increase the level of cobalt in the catalyst system. Thus, in cases where carbon disulfide is required for gel control, the level of cobalt needed is further increased. This accordingly leads to greater polymer instability.

Due to its high melting point, it is normally necessary to heat TPBD in order for it to be processed using conventional mixing equipment, such as a Banbury mixer or a mill mixer. This heating step is typically carried out by storing the trans-1,4-polybutadiene in a "hothouse" for a few days prior to its usage. During this storage period, the bales of the polymer are slowly heated to a temperature above about 200° F. (93° C.). At such temperatures, the polymer can be readily processed in standard mixing equipment. However, the TPBD typically contains residual cobalt from the catalyst system and undergoes undesirable oxidative crosslinking which leads to gelation during this long heating period. This oxidation can crosslink the TPBD to such a high degree that it cannot be processed utilizing standard mixing techniques. In other words, the oxidative gelation that occurs can destroy the polymer.

SUMMARY OF THE INVENTION

This invention is based upon the unexpected finding that certain substituted benzoic acids will act as metal deactivators in TPBD or rubbery polymers synthesized using cobalt or nickel-based catalyst systems. By including these substituted benzoic acids in the polymer, the action of the residual metal as a prooxidant in the polymer is greatly suppressed. In fact, undesirable oxidative crosslinking which can lead to gelation during storage at elevated temperatures can be virtually eliminated in commercial operations by incorporating a small amount of the substituted benzoic acid in the polymer. The substituted benzoic acids that can be used as metal deactivators in accordance with this invention are of the structural formula:

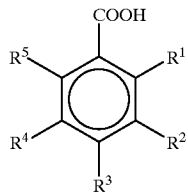

wherein $R^1$ represents —OH, —SH or

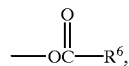

wherein $R^6$ represents an alkyl group containing from 1 to about 12 carbon atoms; and wherein $R^2$, $R^3$, $R^4$ and $R^5$ can be the same or different and represent hydrogen atoms or alkyl groups containing from 1 to about 12 carbon atoms. Salicylic acid, thiosalicylic acid and acetylsalicylic acid are some representative examples of substituted benzoic acids that can be employed as metal deactivators. Salicylic acid is highly preferred for utilization as the metal deactivator in the practice of this invention. In most cases, from about 0.04 phr (parts by weight per 100 parts by weight of the rubber or polymer) to about 1 phr of the substituted benzoic acid will be incorporated into the polymer.

The subject invention specifically discloses a stabilized trans-1,4-polybutadiene composition which is comprised of trans-1,4-polybutadiene and a substituted benzoic acid having the structural formula:

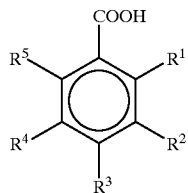

wherein $R^1$ represents —OH, —SH or

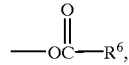

wherein $R^6$ represents an alkyl group containing from 1 to about 12 carbon atoms; and wherein $R^2$, $R^3$, $R^4$ and $R^5$ can be the same or different and represent hydrogen atoms or alkyl groups containing from 1 to about 12 carbon atoms.

The present invention further reveals a process for stabilizing trans-1,4-polybutadiene to provide protection against oxidative crosslinking which comprises: (1) adding a substituted benzoic acid having the structural formula:

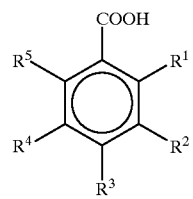

wherein $R^1$ represents —OH, —SH or

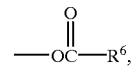

wherein $R^6$ represents an alkyl group containing from 1 to about 12 carbon atoms; and wherein $R^2$, $R^3$, $R^4$ and $R^5$ can be the same or different and represent hydrogen atoms or alkyl groups containing from 1 to about 12 carbon atoms; to a polymer cement of the trans-1,4-polybutadiene; and (2) recovering the trans-1,4-polybutadiene from the cement.

The subject invention further reveals a stabilized rubbery polymer composition which is comprised of a rubbery polymer, such as high cis-1,4 -polybutadiene and an substituted benzoic acid having the structural formula:

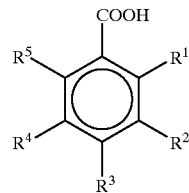

wherein $R^1$ represents —OH, —SH or

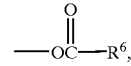

wherein $R^6$ represents an alkyl group containing from 1 to about 12 carbon atoms; and wherein $R^2$, $R^3$, $R^4$ and $R^5$ can be the same or different and represent hydrogen atoms or alkyl groups containing from 1 to about 12 carbon atoms.

DETAILED DESCRIPTION OF THE INVENTION

TPBD is a thermoplastic resin that can be molded into various useful articles. Because TPBD contains many double bonds in its backbone, it can also be blended and cocured with rubbers. Despite the fact that TPBD of this invention is a thermoplastic resin, it becomes elastomeric when cured alone or when cocured with one or more rubbers. TPBD has the ability to strain crystallize which improves properties, such as tensile strength, tear strength and flex fatigue. It can accordingly be used in manufacturing rubber articles such as hoses, belts and tires which have improved performance characteristics. In such applications, the TPBD is generally mixed or blended with one or more rubbery polymers, such as natural rubber, synthetic polyisoprene, cis-1,4-polybutadiene, styrene-butadiene rubber (SBR), styrene-isoprene-butadiene rubber (SIBR), butadiene-isoprene rubber (IBR) or nitrile rubber.

The TPBD utilized in the process of this invention can be synthesized utilizing known techniques. For instance, the TPBD can be synthesized by solution polymerization utilizing the procedure described in U.S. Pat. No. 5,089,574, employing a catalyst system which is comprised of an organocobalt compound, an organoaluminum compound, a para-substituted phenol and carbon disulfide. The molecular weight of the TPBD can be controlled utilizing a molecular weight regulator selected from the group consisting of dialkyl sulfoxides, diaryl sulfoxides and dialkaryl sulfoxides as described in U.S. Pat. No. 5,448,002. The teachings of U.S. Pat. No. 5,089,574 and U.S. Pat. No. 5,448,002 are incorporated herein by reference in their entirety.

The solution polymerization used to synthesize TPBD as described in U.S. Pat. No. 5,089,574 will normally be carried out in a hydrocarbon solvent which can be one or more aromatic, paraffinic or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha, and the like, alone or in admixture.

In such solution polymerizations, there will normally be from 5 to 30 weight percent 1,3-butadiene monomer in the polymerization medium. Such polymerization media are, of course, comprised of the organic solvent and 1,3-butadiene monomer. In most cases, it will be preferred for the polymerization medium to contain from 10 to 25 weight percent monomer. It is generally more preferred for the polymerization medium to contain 15 to 20 weight percent 1,3-butadiene monomer.

It has been found that the microstructure of the TPBD varies with the monomer concentration utilized in its synthesis. Lower monomer concentrations in the polymerization medium result in higher trans contents. As the concentration of 1,3-butadiene monomer in the polymerization medium is increased, the level of trans-1,4 structure decreases. For instance, at a 1,3-butadiene monomer concentration of 5 weight percent, trans contents of about 84 percent are typical. At monomer concentrations of 17 percent, trans contents of about 80 percent are typical. In cases where the polymerization medium contains about 30 weight percent monomer, TPBD having a trans content of only about 68 percent is generally produced.

Such polymerizations can be carried out utilizing batch, semi-continuous or continuous techniques. In a continuous process, additional 1,3-butadiene monomer, catalyst and solvent are continuously added to the reaction zone (reaction vessel). The polymerization temperature utilized will typically be within the range of about 50° C. to about 125° C. It is normally preferred for the polymerization medium to be maintained at a temperature which is within the range of about 65° C. to about 100° C. throughout the polymerization. It is typically most preferred for the polymerization temperature to be within the range of about 70° C. to about 85° C. The pressure used will normally be sufficient to maintain a substantially liquid phase under the conditions of the polymerization reaction.

The polymerization is conducted for a length of time sufficient to permit substantially complete polymerization of the 1,3-butadiene monomer. In other words, the polymerization is normally carried out until high conversions are realized. In commercial operations, conversions in excess of about 80 percent will normally be attained. The polymerization can then be terminated using a standard procedure.

The organocobalt compounds utilized in the catalyst system are typically cobalt salts or cobalt containing organic acids which contain from 1 to about 20 carbon atoms. Some representative examples of suitable organocobalt compounds include cobalt benzoate, cobalt acetate, cobalt naphthenate, cobalt octanoate, cobalt neodecanoate, bis(α-furyl dioxime) cobalt, cobalt palmitate, cobalt stearate, cobalt acetylacetonate, cobalt salicaldehyde, bis(cyclopentadiene) cobalt, cyclopentadienyl-cobalt nitrosyl, bis(π-allyl cobalt), bis(π-allyl cobalt trifluoroacetate) and cobalt tetracarbonyl. Cobalt naphthenate, cobalt octanoate and cobalt neodecanoate are highly preferred organocobalt compounds. Cobalt 2-ethylhexanoate, which is commonly referred to as cobalt octanoate (CoOct) is the organocobalt compound which is most commonly used due to economic factors.

The organoaluminum compounds that can be utilized in the catalyst system typically have the structural formula:

wherein $R^1$ is selected from the group consisting of alkyl groups (including cycloalkyl), aryl groups, alkaryl groups, arylalkyl groups, alkoxy groups and hydrogen; $R^2$ and $R^3$ being selected from the group consisting of alkyl groups (including cycloalkyl), aryl groups, alkaryl groups and arylalkyl groups. Some representative examples of organoaluminum compounds that can be utilized are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride and benzyl isopropyl aluminum hydride, diethylaluminum ethoxide, diisobutylaluminum ethoxide, dipropylaluminum methoxide, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. The preferred organoaluminum compounds include triethyl aluminum (TEAL), tri-n-propyl aluminum, triisobutyl aluminum (TIBAL), trihexyl aluminum and diisobutyl aluminum hydride (DIBA-H). Halogens, such as fluorine, chlorine, bromine and iodine, and halogen containing compounds have been found to be poisons and are detrimental to the polymerization. The polymerization will accordingly be conducted in the absence of significant quantities of halogens and halogen containing compounds.

The para-alkyl substituted phenols which can be utilized in the catalyst system are generally of the structural formula:

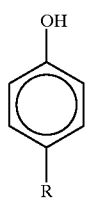

wherein R is an alkyl group which contains from about 6 to about 20 carbon atoms. Such para-alkyl substituted phenols accordingly contain from about 12 to about 26 carbon atoms. In most cases, the alkyl group in the para-alkyl substituted phenol will contain from about 8 to about 18 carbon atoms. Such para-alkyl-substituted phenols contain from about 14 to about 24 carbon atoms. It is typically preferred for the alkyl group in the para-alkyl-substituted phenol to contain from about 9 to about 14 carbon atoms. Such para-alkyl-substituted phenols contain from about 15 to about 20 carbon atoms. Exceptionally good results can be attained utilizing para-alkyl-substituted phenols having alkyl groups which contain 12 carbon atoms. These highly preferred para-alkyl-substituted phenols contain 18 carbon atoms. The polymerization will typically be initiated by charging the catalyst components into the polymerization medium. The amount of organocobalt compound utilized will typically be within the range of about 0.01 phm to about 0.5 phm (parts per hundred parts of 1,3-butadiene monomer). It is generally preferred for the organocobalt compound to be employed at a level which is within the range of about 0.01 phm to about 0.25 phm. It is generally more preferred for the organocobalt compound to be utilized in an amount within the range of about 0.02 phm to about 0.10 phm. The organocobalt compound can be charged directly into the polymerization medium containing the 1,3-butadiene monomer.

The organoaluminum compound will be employed in an amount sufficient to attain a molar ratio of the organoaluminum compound to the organocobalt compound which is within the range of about 1 to about 40. It is typically preferred for the molar ratio of the organoaluminum compound to the organocobalt compound to be within the range of about 2 to about 30. It is more preferred for the ratio of the organoaluminum compound to the organocobalt compound to be within the range of about 4 to about 20.

It is highly preferred for the para-alkyl-substituted phenol to be "prereacted" with the organoaluminum compound prior to charging it into the polymerization medium. This can be accomplished by simply mixing the para-alkyl-substituted phenol with the organoaluminum compound prior to their introduction into the reaction zone. The molar ratio of the para-alkyl-substituted phenol to the organoaluminum compound will typically be within the range of about 2 to about 3. It is generally preferred for the molar ratio of the para-alkyl-substituted phenol to the organoaluminum compound to be within the range of about 2.25 to about 2.75. It is generally most preferred for the ratio of the para-alkyl-substituted phenol to the organoaluminum compound to be within the range of about 2.4 to about 2.6.

It is very important for the carbon disulfide to be introduced into the polymerization medium as a separate component. In other words, the carbon disulfide is added "in situ" to the reaction zone by charging it separately from the other components. In most cases, the organocobalt compound will also be added to the polymerization medium as a separate component.

The molar ratio of the carbon disulfide to the organocobalt compound will generally be within the range of about 0.05 to about 1. Molar ratios of carbon disulfide to the organocobalt compound less than 0.05:1 may not be effective to inhibit gel formation. Molar ratios of carbon disulfide to the organocobalt compound of greater than 1:1 reduce conversions (yields) significantly. As a general rule, it will be preferred for the molar ratio of carbon disulfide to the organocobalt compound to be within the range of about 0.1 to about 0.5. It is typically more preferred for the molar ratio of carbon disulfide to the organocobalt compound to be within the range of about 0.2 to about 0.3.

The polymerization, of course, results in the formation of solutions containing the TPBD (a polymer cement). In the TPBD produced, at least about 65 percent of the butadiene repeat units in the polymer are of the trans-1,4-isomeric structure. The TPBD typically has a trans-isomer content of at least about 70 percent. In most cases, the TPBD will have a trans-isomer content which is within the range of about 75 percent to about 85 percent. TPBD that is synthesized utilizing cobalt-based catalyst systems will typically contain residual amounts of cobalt compounds. A substituted benzoic acid will be added to the TPBD as a metal deactivator to provide it with improved stability against oxidative crosslinking.

The substituted benzoic acids that can be utilized as metal deactivators are of the structural formula:

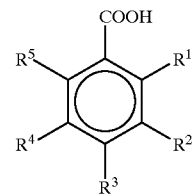

wherein $R^1$ represents —OH, —SH or

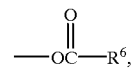

wherein $R^6$ represents an alkyl group containing from 1 to about 12 carbon atoms; and wherein $R^2$, $R^3$, $R^4$ and $R^5$ can be the same or different and represent hydrogen atoms or alkyl groups containing from 1 to about 12 carbon atoms. It is typically preferred for $R^2$, $R^3$, $R^4$ and $R^5$ to represent hydrogen atoms. In cases where $R^2$, $R^3$, $R^4$ or $R^5$ represent an alkyl group, it is typically preferred for the alkyl group to contain from 1 to about 6 carbon atoms. Salicylic acid, thiosalicylic acid and acetylsalicylic acid are some representative examples of substituted benzoic acids that can be utilized as the metal deactivator. Salicylic acid and acetylsalicylic acid are preferred with salicylic acid being highly preferred for economic reasons.

In most cases, a shortstop, such as 2-propanol, and an antioxidant will be added to the polymer cement after the desired degree of polymerization has been attained. Sulfur containing antioxidants, such as Wingstay® K antioxidant or Irganox® 565 antioxidant, are highly preferred for this purpose. In fact, sulfur containing antioxidants and substituted benzoic acids act synergistically to protect the rubbery polymer from degradation. It should be noted that Wingstay® K antioxidant is the reaction product of n-dodecylmercaptan, para-nonylphenol and formaldehyde. It will typically be convenient to add a dispersion of the substituted benzoic acid in a processing oil to the polymer cement during the same timeframe. The processing oil used will typically contain at least about 20 percent aromatic oils and will preferably contain at least about 30 percent aromatic oils. For example, the processing oil might contain 30 percent to 50 percent aromatic oils, 10 percent to 40 percent napthenic oils and 20 percent to 50 percent paraffinic oils. A preferred processing oil for utilization in the process of this invention contains 35 percent to 45 percent aromatic oils, 15 percent to 30 percent napthenic oils and 25 percent to 45 percent paraffinic oils.

The dispersion of the substituted benzoic acid in processing oil will typically contain from about 10 weight percent to about 50 weight percent of the substituted benzoic acid and will preferably contain from about 15 weight percent to about 40 weight percent of the substituted benzoic acid. It will normally be most preferred for the dispersion to contain from about 20 weight percent to about 30 weight percent of the substituted benzoic acid. A sufficient amount of the dispersion of the substituted benzoic acid in processing oil will be added to the polymer cement to result in a polymer which contains from about 0.04 phr to about 1 phr of the substituted benzoic acid. It is typically preferred for the stabilized polymer to contain from about 0.2 phr to about 0.8 phr of the substituted benzoic acid and it is most preferred for the stabilized polymer to contain from about 0.4 phr to about 0.6 phr of the substituted benzoic acid. However, up to about 50 percent of the substituted benzoic acid can be lost during steam-stripping. Thus, the amount of the dispersion of substituted benzoic acid in processing oil added should be adjusted accordingly.

Standard techniques can be utilized to recover the TPBD from the polymer cement in which it is dissolved. Coagulation techniques will typically be employed to recover the TPBD from the organic solvent. Such coagulation procedures typically involve the addition of an alcohol or ketone to the TPBD solution to induce coagulation. Fortunately, most of the substituted benzoic acid will remain in the polymer after coagulation. The TPBD can also, of course, be recovered from the organic solvent by evaporation procedures. Such evaporation procedures typically involve heating the polymer solution to a slightly elevated temperature in conjunction with the application of vacuum.

The TPBD made utilizing the techniques of this invention is a thermoplastic resin. It can be molded into various useful articles. Because the TPBD contains many double bonds in its backbone, it can also be blended and cocured with rubbers. Despite the fact that TPBD is a thermoplastic resin, it becomes elastomeric when cured alone or when cocured with one or more rubbers. TPBD has the ability to strain crystallize which improves properties, such as tensile strength, tear strength and flex fatigue. It can accordingly be used in manufacturing rubber articles such as hoses, belts and tires which have improved performance characteristics.

In most cases, the TPBD will be heated in a hothouse to a temperature which is within the range of about 105° F. (41° C.) to about 205° F. (96° C.) before it is processed or blended with rubbers. Before being processed, it is normally preferred for the TPBD to be heated to a temperature which is within the range of about 110° C. (43° C.) to about 160° F. (71° C.) and it is most preferred for the TPBD to be heated to a temperature which is within the range of about 120° F. (49° C.) to about 140° F. (60° C.). This heating in the hothouse is normally done over a period of at least several days and, in some extreme cases, the polymer may be in the hothouse for as long as several weeks. In any case, the stabilized polymer of this invention will be protected from oxidative crosslinking at the high temperatures experienced in the hothouse for at least a month.

This invention is illustrated by the following examples which are merely for the purpose of illustration and are not to be regarded as limiting the scope of the invention or the manner in which it can be practiced. Unless specifically indicated otherwise, all parts and percentages are given by weight.

COMPARATIVE EXAMPLE 1

In this experiment, TPBD that was synthesized utilizing a cobalt-based catalyst system was stabilized with 1.0 phr of diaryl-p-phenylenediamine antioxidant. Although this stabilizer was effective at lower temperatures, from room temperature up to 160° F. (71° C.), it did not adequately protect the polymer from oxidative crosslinking at temperatures commonly experienced during storage in a hothouse. More specifically, the TPBD gelled within a few days of storage at a temperature of about 200° F. (93° C.). This short period of safe hothouse storage is not considered adequate for commercial applications.

EXAMPLES 2–18

In this series of experiments, TPBD was synthesized utilizing a cobalt-based catalyst system. These polymerizations were carried out in 4-ounce (118 ml) polymerization bottles that contained 14 percent 1,3-butadiene in hexane solutions. The polymerizations were initiated by adding an aluminum catalyst component followed by the addition of a cobalt catalyst component.

The cobalt catalyst component was made by adding cobalt (III) acetylacetonate (CoAA), also known as cobaltic acetylacetonate, to a make-up vessel followed by the addition of a p-dodecylphenol (DP) in hexanes solution at a ratio of DP to CoAA of 14:1. About 30 percent of the hexanes was added and then the bottle was placed on a shaker. Dissolution was completed within a few minutes and more hexanes were added to attain a final concentration of 0.05 M cobalt. The aluminum catalyst component was prepared by reacting triethylaluminum with 2 moles of DP in hexanes. The final concentration was adjusted by the addition of hexanes to 0.25 M aluminum. It should be noted that the term "hexanes" as used herein refers to a mixture of various hexane isomers.

During the polymerizations, the polymerization bottles were rotated end-over-end in a water bath that was maintained at a temperature of 65° C. After about 2 hours of polymerization time, a rosin acid shortstop was added to terminate the polymerizations. The rotation of the polymerization bottles was continued for about 10 more minutes and then Wingstay® K was added to stabilize the polymer cements. After about 10 more minutes of agitation, a substituted benzoic acid solution was added as a metal deactivator. The specific substituted benzoic acid utilized and the amount of substituted benzoic acid added is shown in Table I. Example 2 was carried out as a comparative example with no substituted benzoic acid being added.

Aliquots of the polymer samples being tested were cut into pieces having dimensions of approximately one inch by one inch (2.54 cm×2.54 cm) and having a thickness of about 1/16 inch (1.59 mm). The samples were then placed on a piece of Teflon and held in a forced air oven that was maintained at a temperature of 205° F. (96° C.). Aliquots of the aged samples were removed from the oven at various times as shown in Table I and tested for gel by solubility in toluene. Gelation was deemed to have occurred if it could be measured by observing that polymer was lost by filtration.

TABLE I

| Example | Metal Deactivator | Level (phr) | Time to Gel (days) |
|---|---|---|---|
| 2 | None | — | 1 |
| 3 | Thiosalicylic Acid | 0.023 | 1 |
| 4 | Thiosalicylic Acid | 0.046 | 15 |
| 5 | Thiosalicylic Acid | 0.093 | 31 |
| 6 | Thiosalicylic Acid | 0.19 | 42 |
| 7 | Thiosalicylic Acid | 0.37 | 42 |
| 8 | Thiosalicylic Acid | 0.74 | 42 |
| 9 | Salicylic Acid | 0.11 | 31 |
| 10 | Salicylic Acid | 0.21 | 42 |
| 11 | Salicylic Acid | 0.41 | 42 |
| 12 | Salicylic Acid | 0.62 | 42 |
| 13 | Salicylic Acid | 0.83 | 42 |
| 14 | Acetylsalicylic Acid | 0.14 | 31 |
| 15 | Acetylsalicylic Acid | 0.27 | 31 |
| 16 | Acetylsalicylic Acid | 0.54 | 42 |
| 17 | Acetylsalicylic Acid | 0.81 | 42 |
| 18 | Acetylsalicylic Acid | 1.08 | 42 |

As can be seen, the substituted benzoic acids employed acted as metal deactivators and protected the TPBD from oxidative degradation at levels of about 0.05 phr. In fact, all of the substituted benzoic acids evaluated in this experiment provided the TPBD with sufficient stability against oxidative crosslinking to be stored in a hothouse at be stored in a hothouse at temperatures in excess of 200° F. (93° C.) for a period of longer than one month.

COMPARATIVE EXAMPLES 19–29

In this series of experiments, various organic compounds were evaluated as metal deactivators utilizing the procedure described in Examples 2–18. The organic compounds evaluated are identified in Table II.

TABLE II

| Ex. | Organic Compound | Level (phr) | Time to Gel (days) |
|---|---|---|---|
| 19 | None | — | 1 |
| 20 | Triisopropanolamine | 1 | 1 |
| 21 | Diethylhydroxylamine | 1 | 1 |
| 22 | Diethylene triamine | 1 | 1 |
| 23 | Diethyloxalate | 1 | 1 |
| 24 | Phthalic Anhydride | 1 | 1 |
| 25 | Dioctylphthalate | 1 | 1 |
| 26 | Dioctylthioglycolate | 1 | 1 |
| 27 | N-octenylsuccinic Anhydride | 1 | 1 |
| 28 | Esters of Phthalic Acid* | 1 | 1 |
| 29 | Esters of Maleic Acid* | 1 | 1 |
| 30 | Benzoic Acid | 1 | 1 |

*The anhydride was reacted with various alcohols at 65° C. for 24 hours. In most cases, the product was soluble in hexanes. However, the products were not characterized.

As can be seen from Table II, none of the organic compounds evaluated in this series of experiments acted as metal deactivators and protected the TPBD from oxidative degradation at a level of 1 phr.

While certain representative embodiments and details have been shown for the purpose of illustrating the present invention, it will be apparent to those skilled in this art that various changes and modifications can be made therein without departing from the scope of the present invention.

What is claimed is:

1. A stabilized trans-1,4-polybutadiene composition which is comprised of trans-1,4-polybutadiene and an substituted benzoic acid having the structural formula:

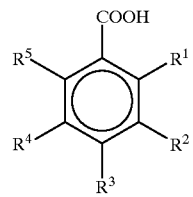

wherein $R^1$ represents —OH, —SH or

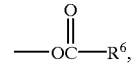

wherein $R^6$ represents an alkyl group containing from 1 to about 12 carbon atoms; and wherein $R^2$, $R^3$, $R^4$ and $R^5$ can be the same or different and represent hydrogen atoms or alkyl groups containing from 1 to about 12 carbon atoms.

2. A stabilized rubbery polymer composition which is comprised of a rubbery polymer and an substituted benzoic acid having the structural formula:

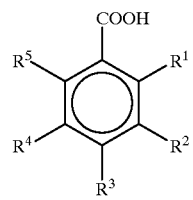

wherein $R^1$ represents —OH, —SH or

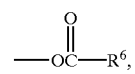

wherein $R^6$ represents an alkyl group containing from 1 to about 12 carbon atoms; and wherein $R^2$, $R^3$, $R^4$ and $R^5$ can be the same or different and represent hydrogen atoms or alkyl groups containing from 1 to about 12 carbon atoms.

3. A process for stabilizing trans-1,4-polybutadiene to provide protection against oxidative crosslinking which comprises: (1) adding a substituted benzoic acid having the structural formula:

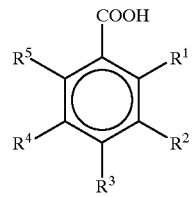

wherein $R^1$ represents —OH, —SH or

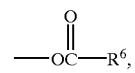

wherein $R^6$ represents an alkyl group containing from 1 to about 12 carbon atoms; and wherein $R^2$, $R^3$, $R^4$ and $R^5$ can be the same or different and represent hydrogen atoms or alkyl groups containing from 1 to about 12 carbon atoms; to a polymer cement of the trans-1,4-polybutadiene; and (2) recovering the trans-1,4-polybutadiene rubber from the cement.

4. A stabilized trans-1,4-polybutadiene composition as specified in claim 1 wherein the substituted benzoic acid is selected from the group consisting of salicylic acid, thiosalicylic acid and acetylsalicylic acid.

5. A stabilized trans-1,4-polybutadiene composition as specified in claim 1 wherein the substituted benzoic acid is present in an amount which is within the range of about 0.04 phr to about 1 phr.

6. A stabilized trans-1,4-polybutadiene composition as specified in claim 4 wherein the substituted benzoic acid is present in an amount which is within the range of about 0.04 phr to about 1 phr.

7. A stabilized trans-1,4-polybutadiene composition as specified in claim 4 wherein the stabilized trans-1,4-polybutadiene composition is further comprised of at least one residual cobalt compound.

8. A stabilized trans-1,4-polybutadiene composition as specified in claim 7 wherein the substituted benzoic acid is salicylic acid.

9. A stabilized trans-1,4-polybutadiene composition as specified in claim 7 wherein the substituted benzoic acid is thiosalicylic acid.

10. A stabilized trans-1,4-polybutadiene composition as specified in claim 8 wherein the salicylic acid is present in an amount which is within the range of about 0.2 phr to about 0.8 phr.

11. A stabilized trans-1,4-polybutadiene composition as specified in claim 8 wherein the salicylic acid is present in an amount which is within the range of about 0.4 phr to about 0.6 phr.

12. A stabilized rubbery polymer composition as specified in claim 2 wherein the rubbery polymer is cis-1,4-polybutadiene and wherein the cis-1,4-polybutadiene contains a residual nickel compound.

13. A stabilized rubbery polymer composition as specified in claim 12 wherein the substituted benzoic acid is selected from the group consisting of salicylic acid, thiosalicylic acid and acetylsalicylic acid.

14. A stabilized rubbery polymer composition as specified in claim 13 wherein the substituted benzoic acid is present in an amount which is within the range of about 0.04 phr to about 1 phr.

15. A stabilized rubbery polymer composition as specified in claim 14 wherein the substituted benzoic acid is salicylic acid.

16. A stabilized rubbery polymer composition as specified in claim 14 wherein the substituted benzoic acid is thiosalicylic acid.

17. A stabilized rubbery polymer composition as specified in claim 15 wherein the salicylic acid is present in an amount which is within the range of about 0.2 phr to about 0.8 phr.

18. A stabilized rubbery polymer composition as specified in claim 15 wherein the salicylic acid is present in an amount which is within the range of about 0.4 phr to about 0.6 phr.

19. A process as specified in claim 2 wherein the substituted benzoic acid is added to the polymer cement as a dispersion in a processing oil.

20. A process as specified in claim 19 wherein the substituted benzoic acid is salicylic acid.

* * * * *